Aug. 28, 1945.　　　A. G. ACKERMANN　　　2,383,835
CARCASS DIPPING APPARATUS
Filed Nov. 6, 1942　　　5 Sheets-Sheet 1

Inventor
Adolf G. Ackermann

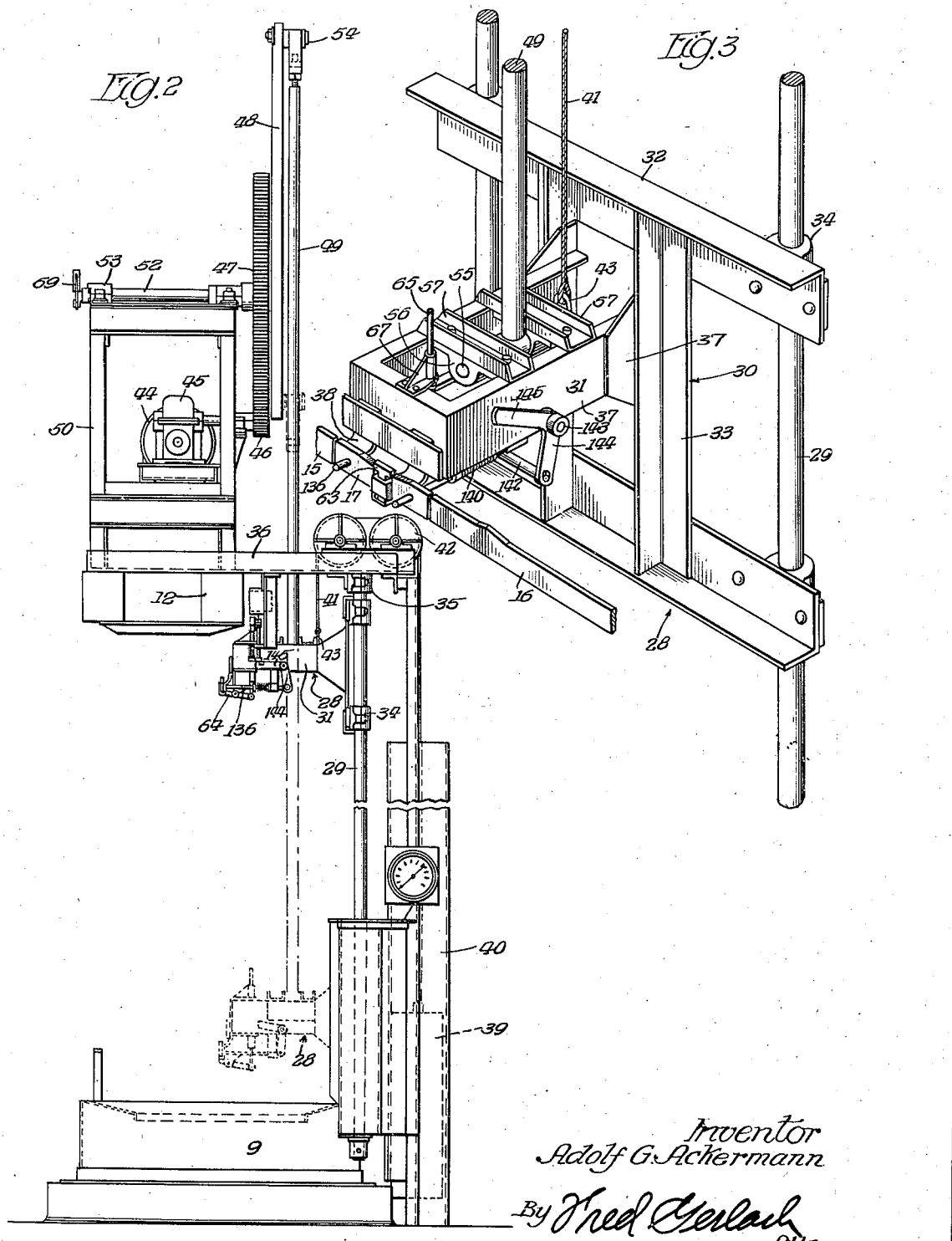

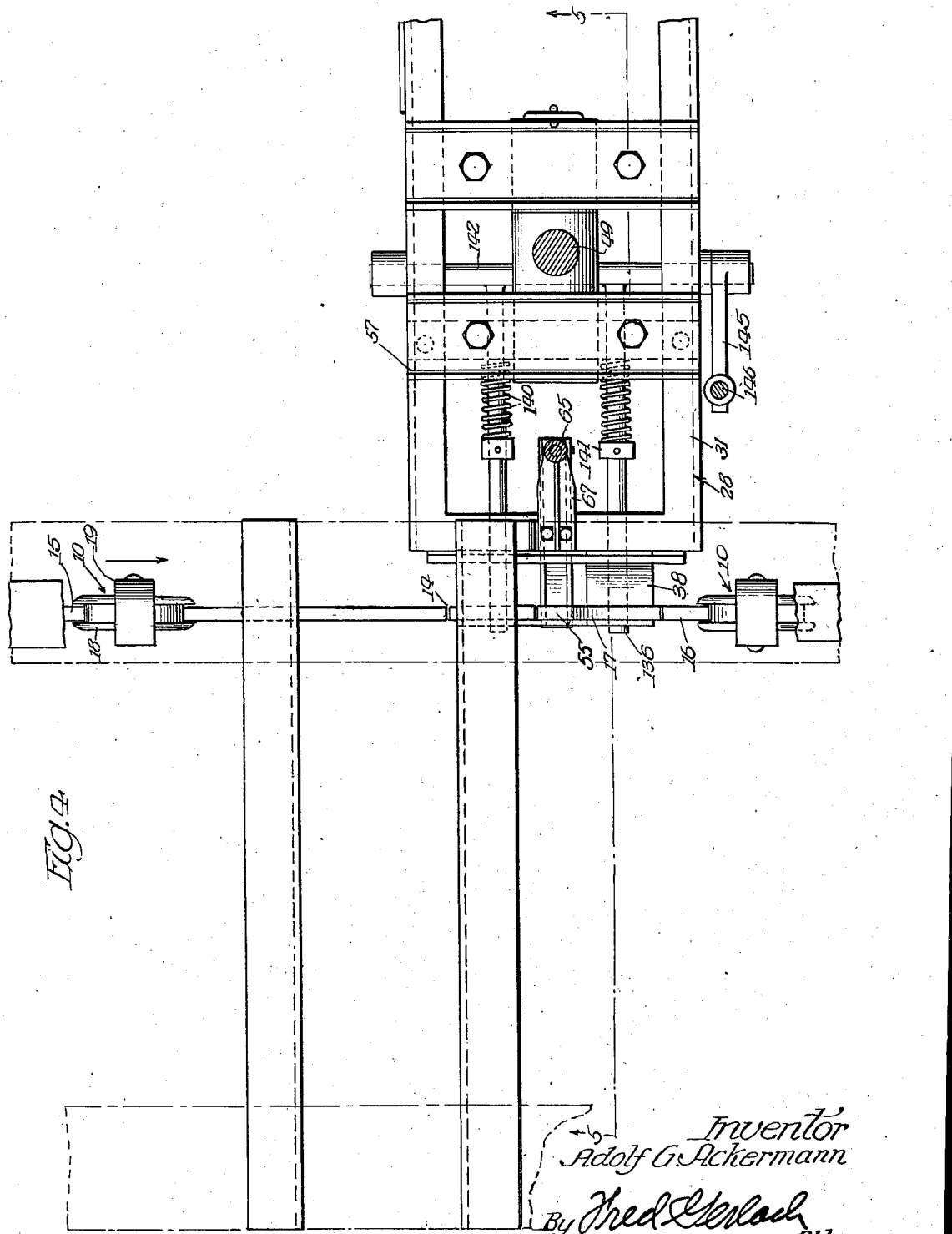

Aug. 28, 1945.   A. G. ACKERMANN   2,383,835
CARCASS DIPPING APPARATUS
Filed Nov. 6, 1942   5 Sheets-Sheet 4
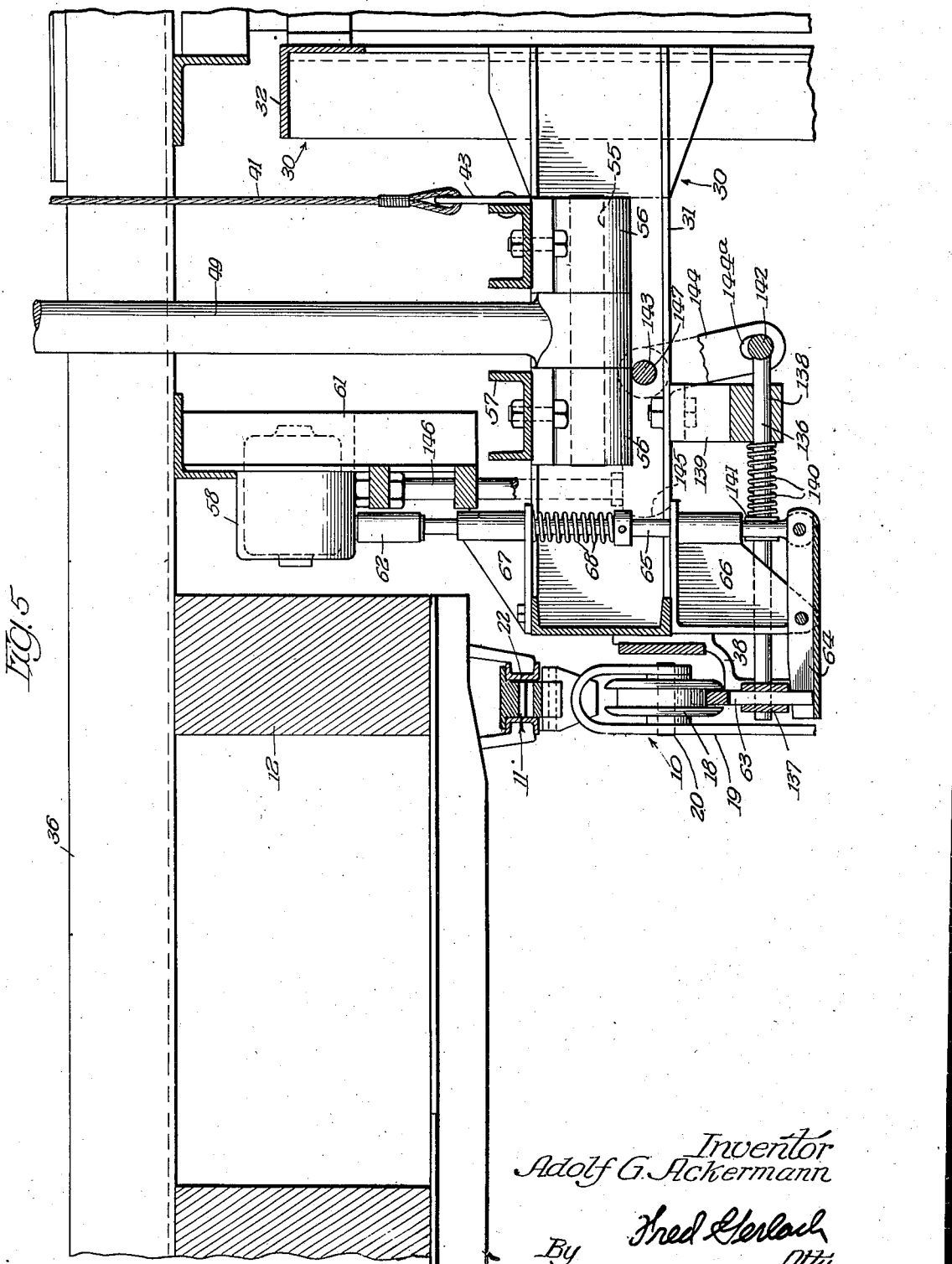
Inventor
Adolf G. Ackermann
By Fred Gerlach
Atty Aug. 28, 1945.　　　A. G. ACKERMANN　　　2,383,835
CARCASS DIPPING APPARATUS
Filed Nov. 6, 1942　　　5 Sheets-Sheet 5

Inventor
Adolf G. Ackermann
By Fred Gerlach Atty

Patented Aug. 28, 1945

2,383,835

UNITED STATES PATENT OFFICE 2,383,835

CARCASS DIPPING APPARATUS

Adolf G. Ackermann, St. Louis, Mo., assignor to The Allbright-Nell Company, Chicago, Ill., a corporation of Illinois Application November 6, 1942, Serial No. 464,759

6 Claims. (Cl. 17—1)

In general the present invention relates to apparatus for dipping machine dehaired hog carcasses in a tank of hot congealable resinous material in order to form seal-like coatings which, upon stripping or peeling from the carcasses after partial hardening or congelation of the material, effect removal of the hair and roots remaining on the carcasses after the machine dehairing process as well as removal of glandular secretions and other undesirable matter from the skin portions of the carcasses. More particularly the invention relates to that type of carcass dipping apparatus which operates in conjunction with an overhead rail for use with gambrel supporting trolleys in conveying the carcasses from the dehairing machine or the usual gambrel applying table at the discharge end of the dehairing machine to either a polishing machine or the carcass cutting and inspection line, and comprises—(1) a rail section which overlies the tank, forms a part of the overhead rail, and is shiftable vertically between an up position wherein it fits within a cutout in the rail and is adapted to receive the carcass supporting trolleys as they travel one at a time along the rail, and a down position wherein any carcass suspended therefrom is caused to be immersed in the tank for coating purposes, and (2) mechanism for shifting the rail section downwards into its down position after a carcass supporting trolley travels thereon and then raising the section into its up position in order to permit the dipped carcass to travel further along the rail and render the rail section operative to receive the next following carcass on the overhead rail.

One object of the invention is to provide a carcass dipping apparatus of this type which is an improvement upon, and has certain advantages over, previously designed apparatus of like character.

Another object of the invention is to provide a carcass dipping apparatus of the type under consideration in which the vertically movable rail section forming a part of the trolley supporting overhead rail is carried by a carriage and the mechanism for shifting the rail section back and forth between its up and down positions includes motor driven gearing, a crank on the driven part or element of the gearing and a connecting rod between the crank and the carriage.

Another object of the invention is the provision, in connection with a dipping apparatus of the type under consideration, of novel electrical means for controlling the motor of the carriage lowering and raising mechanism so that it starts each time a carcass supporting trolley moves onto the movable rail section and then stops as soon as the carriage reaches its up position.

A further object of the invention is to provide a carcass dipping apparatus which is generally of new and improved construction, effectively and efficiently fulfills its intended purpose, and is characterized by the fact that it embodies a compact arrangement of parts and may be manufactured and installed at a comparatively low cost.

Other objects of the invention and the various advantages and characteristics of the present carcass dipping apparatus will be apparent from a consideration of the following detailed description.

The invention consists in the several novel features which are hereinafter set forth and are more particularly defined by claims at the conclusion hereof.

In the drawings which accompany and form a part of this specification or disclosure and in which like numerals of reference denote corresponding parts throughout the several views:

Figure 2 is a side view of the apparatus, illustrating in detail the construction and arrangement of the mechanism for shifting the rail section carrying carriage back and forth between its down and up positions;

Figure 3 is a perspective of the carriage;

Figure 4 is an enlarged plan view of the vertically movable carriage;

Figure 5 is a vertical transverse section on the line 5—5 of Figure 4;

Figure 1:
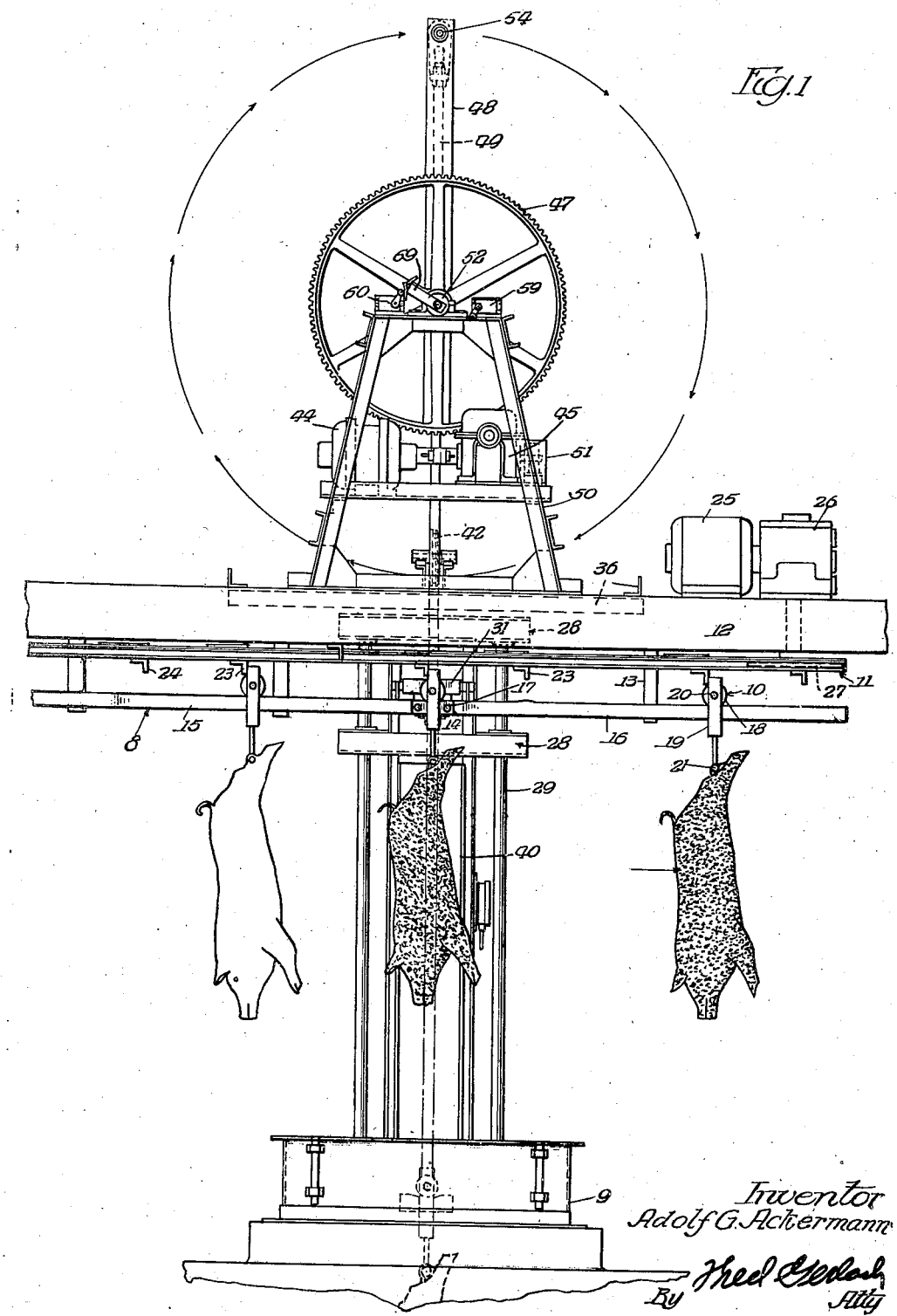
Figure 1 is a front view of a carcass dipping apparatus embodying the invention.

The apparatus which is illustrated in the drawings constitutes the preferred form or embodiment of the invention. It is designed for use in a combined slaughtering and packing house having an overhead rail 8 for conveying hog carcasses from a dehairing machine (not shown) to either the usual cutting and inspection line or a polishing machine in front of the line, and serves, during operation thereof, to dip the carcasses, one at a time, into a tank 9 containing hot congealable resinous material in order to apply substantially complete seal-like coatings which, when stripped or pealed from the carcasses after congelation of the material, remove the hair and roots remaining on the carcasses after the machine dehairing operation and also effect removal of various glandular secretions and other undesirable matter from the skin portions of the carcasses. The overhead rail 8 is adapted to support the hog carcasses in an inverted depending position by way of trolleys 10 and is associated with a conveyor 11 which, upon drive thereof causes the carcass supporting trolleys to travel along the rail. As shown in Figure 1, the overhead rail is supported in a depending manner from an overhead beam 12 by way of straps 13. It extends horizontally and is arranged so that the carcasses during travel therealong pass over the tank 9. The tank is preferably embedded in the floor of the combined slaughtering and packing house wherein the improved apparatus is employed. It is heated in any suitable manner, such, for example, as by way of steam coils in order that the resinous material therein is maintained in a molten or liquid condition. The overhead rail 8 has a cutout 14 directly over the tank and comprises a fixed preceding rail section 15 and a fixed following rail section 16. The preceding rail section leads from the aforementioned dehairing machine for the hog carcasses or the gambrel applying table at the discharge end of the dehairing machine to the cutout 14 over the tank 9 and the following rail section 16 leads from the cutout to the aforementioned polishing machine or cutting and inspection line. A vertically movable rail section 17 constituting one of the elements of the dipping apparatus, is associated with, and forms a part of, the overhead rail 8. This rail section 17 is shiftable back and forth between an up position wherein it fits within the cutout 14 and serves to bridge or connect the preceding and following rail sections 15 and 16, and a down position wherein it is disposed adjacent the top of the tank 9. When a carcass carrying trolley travels onto the rail section 17 the section is shifted downwards to its down position and then raised to its up position. During the down stroke of the rail section 17 the carcass which is suspended from the trolley on the said rail section 17 enters the tank 9, as shown by dotted lines in Figure 1, and is coated with the heated congealable resinous material in the tank. After shift of the rail section 17 into its up position the trolley having the coated carcass suspended therefrom moves onto and travels along the following rail section 16 of the overhead rail and the rail section 17 is in a position to receive the next following carcass supporting trolley 10. The trolleys comprise grooved wheels 18 and frames 19 and are moved along the rail 8 by way of the conveyor 11. The wheels 18 of the trolleys ride on the upper surfaces of the rail sections 15, 16 and 17. The trolley frames 19 are vertically elongated and have inverted U-shaped upper ends which overlie the wheels and are connected thereto by way of stub axles 20. The lower ends of the trolley frames underlie the rail sections during travel of the trolleys therealong and have gambrels 21 suspended therefrom by way of I-bolts or like attaching means. The gambrels are adapted to be applied to the hocks of the carcasses after the latter have been subjected to the action of the dehairing machine and extend substantially horizontally when the trolleys to which they are applied move or travel along the overhead rail 8.

Figure 6:
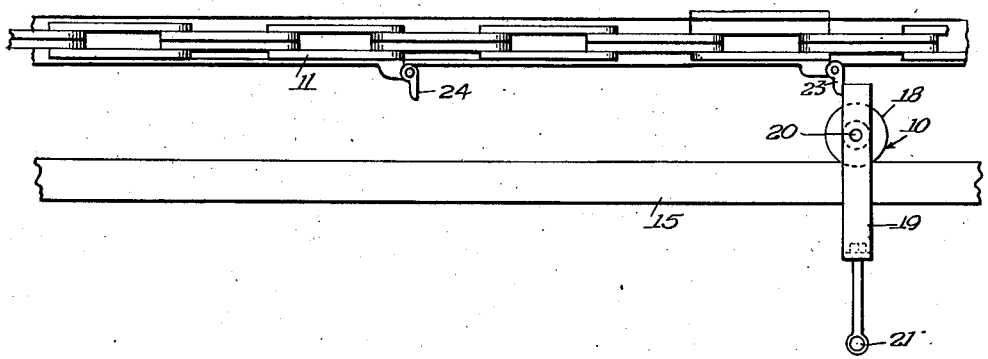
Figure 6 is a fragmentary front view of the overhead rail and the trolley pushing conveyor.

The conveyor 11 for moving the carcass supporting trolleys along the overhead rail 8 is of the chain variety and overlies and extends in parallel relation with the rail. It is mounted between a pair of laterally spaced channel bars 22 beneath the beam 12 and has on the under side thereof a series of pairs of pusher fingers 23 and 24. The pairs of fingers are spaced equidistantly apart, as shown in Figure 6. The fingers 23 are located a short distance ahead of the fingers 24 and are adapted to engage the frames of the trolleys and push or feed the trolleys along the preceding rail section 15. The fingers 24 serve as follow-up fingers and are adapted to engage the trolley frames and feed or propel the trolleys while the latter are on the following rail section 16. It is contemplated that when the apparatus is in operation the conveyor 11 be driven continuously at a comparatively low speed. After a carcass is applied to a gambrel on a trolley the trolley is placed on the preceding rail section 14 ahead of one of the pusher fingers 23. As soon as the finger strikes the frame of the trolley the trolley is moved along the rail section 15 and then onto the vertically movable rail section 17. As soon as the trolley moves onto such section the latter is shifted downwards and upwards for carcass dipping purposes. During downward and upward shift of the rail section 17 the pusher finger 23 that has pushed the trolley onto the rail section 17 moves onward and the pusher finger 24 directly therebehind moves or travels into a position wherein it is in readiness to engage the frame of the trolley on the rail section 17 as soon as the rail section reaches its up position. As soon as the rail section is shifted into its up position the adjacent pusher finger 24 contacts the frame of the trolley on the rail section 17 and causes the trolley to move off the rail section 17 and along the following rail section 16 of the overhead rail 8. The conveyor 11 is driven for carcass moving or propelling purposes by way of an electric motor 25, a gear type speed reducer 26 and a sprocket 27. The motor 25 is mounted on the overhead beam 12 and has its armature shaft thereof connected to the drive shaft of the speed reducer 26. The sprocket 27 meshes with the chain constituting the conveyor 11 and is connected to the driven shaft of the speed reducer. The electric motor 25, the speed reducer 26 and the sprocket 27 are so designed that during operation of the motor the conveyor 11 travels at such speed that after one of the pusher fingers 23 delivers a carcass supporting trolley onto the vertically movable rail section 17 the following pusher finger 24 is in a position to propel the trolley after down and up movement of the rail section 17. In other words, the conveyor 11 for propelling the carcass supporting trolleys along the overhead rail 8, is driven in synchronism or in timed relation with the combined down and up movement of the vertically movable rail section 17.

The dipping apparatus comprises in addition to the rail section 17, a vertically slidable carriage 28 for the rail section and mechanism for shifting the carriage down and up for carcass dipping purposes. The carriage is mounted for vertical sliding movement on a pair of laterally spaced upstanding rods 29 and comprises a vertically extending angle bar type frame 30 and a U-shaped bracket 31. The frame 30 consists of a pair of vertically spaced horizontally extending angle bars 32 and a pair of laterally spaced vertically extending angle bars 33. The angle bars 33 extend between the central portions of the angle bars 32 and have the ends thereof welded or otherwise fixedly secured to said central portions of the angle bars 32. The ends of the horizontally extending angle bars of the frame 30 have sleeves 34 fixedly secured thereto and these sleeves surround and are adapted to slide vertically on the rods 29. The lower ends of the rods are mounted in a fixed bracket structure directly behind the tank and the upper ends of the rods fit within a pair of brackets 35 on the rear end of a horizontally extending platform 36. The latter, as shown in Figure 2, overlies the vertically movable rail section 17 and is mounted on, and carried by, the overhead beam 12. The U-shaped bracket 31 of the carriage 28 extends or projects forwardly from the central portion of the frame 30 and is arranged so that the crosspiece thereof is at the front. The rear ends of the side pieces of the bracket fit between the central portions of the vertically extending angle bars 33 of the frame 30 and are secured thereto by way of plates 37. The rail section 17 is located in front of the crosspiece of the U-shaped bracket 31 and is fixedly secured thereto by way of a pair of laterally spaced brackets 38. By reason of the fact that the rail section 17 is fixedly connected to the bracket 31 down and up sliding movement of said carriage 28 on the rods 29 results in corresponding movement of said rail section. The carriage 28 is confined by rods 29 to rectilinear sliding movement and is counterbalanced by way of a counterweight 39. The latter is mounted for vertical sliding movement between a pair of oppositely facing channel beams 40 and is operatively connected to the carriage by way of a cable 41. The cable is trained over a pair of longitudinally aligned sheaves 42 on the rear end of the platform 36 and has one end thereof connected to the upper end of the counterweight 39. The other end of the cable is connected to the carriage 28 by way of an apertured plate 43 at the inner end of the U-shaped bracket 31. The beams 40 for guiding the counterweight 39 are located behind the upstanding rods 29. When the carriage 28 slides upwards in connection with shift of the rail section 17 into its up position wherein it bridges the cutout 14 in the overhead rail 8, the counterweight 39 slides downwards. When the carriage 33 is shifted downwards in connection with a hog dipping operation the counterweight moves or slides upward. The weight of the counterweight is preferably equal to the combined weight of the carriage 28 and an average hog carcass.

The mechanism for shifting the carriage consists of an electric motor 44, a gear type speed reducer 45, a pinion 46, a gear wheel 47, a crank 48 and a connecting rod 49. It is mounted for the most part above the platform 36 and is controlled automatically as hereinafter described. The electric motor is mounted on an A-shaped frame structure 50 on the front end of the platform 36. It is disposed in opposed relation with the speed reducer 45 and has the armature shaft thereof coupled or otherwise connected to the drive shaft of the speed reducer. The speed reducer, as shown in Figure 1, is also mounted on the frame structure 50. It is of conventional or standard design and has associated therewith a solenoid type brake 51. The brake is in circuit with the electric motor and is so arranged that it operates immediately to stop the gearing and armature shaft when the supply of current to the motor 44 is cut off. The pinion 46 is located behind the frame structure 50 and is keyed or otherwise fixedly secured to the driven shaft of the speed reducer 45. It meshes with, and serves to drive, the gear wheel 47. The latter overlies the pinion 46 and is fixed to a horizontal shaft 52 which is journaled in a pair of bearings 53 on the upper portion of the frame structure 50. The crank 48 is in the form of an arm which is mounted on, and extends radially with respect to, the gear wheel 47. The connecting rod 49 is located in back of the gear wheel 47, as shown in Figure 2, and has one end thereof connected to the outer or distal end of the crank 48 by a pivot pin 54. The other end of the connecting rod is pivotally connected to the carriage 28 by way of a pin 55. The latter extends through an apertured lug at said other end of the connecting rod 49 and is journaled in a pair of axially aligned bearings 56 within the U-shaped bracket 31 of the carriage. The bearings, as shown in Figure 3, extend between the side pieces of the U-shaped bracket 31 and are connected thereto by way of channel bars 57. The gear wheel 47 rotates in a vertical plane and operates, when driven, to revolve the crank 48 and thus effect vertical shift of the carriage 28. When the crank 48 extends upwards in a vertical position, as shown in Figure 1, the connecting rod 49 is in a raised position and maintains the carriage 28 and the rail section 17 in their up position. When the gear wheel 47 is rotated throughout a 360° arc the carriage and vertically movable rail section move downwards during rotation of the gear wheel throughout the first 180° and then move upwards during the next 180° turning or rotative movement on the part of the gear wheel. When the crank 48 extends downwardly in a vertical position the carriage and movable rail section are in their fully lowered position. The length of the crank arm determines the amount of stroke or reciprocatory movement of the carriage. The crank is preferably of such length that when it is in its down position the carriage is lowered to a point where the carcass depending from the trolley on the rail section 17 is substantially fully immersed in the material in the tank 9. It is contemplated that the crank will be rotated or turned one complete revolution each time a carcass carrying trolley is moved by the chain type conveyor 11 on to the rail section 17. It is also contemplated that the speed of turn or rotation of the crank will be such that the carriage 28 and the rail section 17 will be returned to their up position directly before the next following pusher finger 24 on the conveyor reaches the cutout 14 in the overhead rail 8. As hereinafter described, the motor 44 is controlled automatically so that as soon as a carcass supporting trolley moves onto the rail section 17 the crank 48 is rotated throughout an arc of 360° in order to cause dipping of the carcass into the material in the tank and then return of the carcass to a position wherein it is in readiness to be fed along the following rail section 16 by the next following pusher finger 24.

The electric motor 44 is controlled automatically so that it starts as soon as a carcass supporting trolley is fed onto the rail section 17 and then stops after the crank has completed one complete revolution so as to cause the carriage to move down and then up. The automatic control means for the motor 44 includes a limit switch 58, a normally open limit switch 59 and a normally closed limit switch 60. The limit switch 58 is mounted on a bracket 61 which depends from the rear end of the platform 36 and overlies the vertically movable carriage 28. As shown in Figure 5, the limit switch 58 embodies on the under side thereof a vertically movable control element 62 and is actuated by way of a vertically movable trigger 63, a lever 64 and a push rod 65. The trigger 63 is mounted in the central portion of the rail section 17 for vertical sliding movement and is adapted to be depressed by the carcass supporting trolley which travels onto said rail section and to move upwards as soon as the trolley is fed from the rail section 17 onto the following rail section 16 of the overhead rail 8. The lever 64 underlies and extends transversely of the rail section 17 and is supported for central fulcruming thereof by way of a depending bracket 66 on the crosspiece of the U-shaped bracket 31 of the carriage 28. The front end of the lever 64 is in engagement with the lower end of the trigger 63 with the result that when the trigger is depressed the lever 64 is rocked in a counterclockwise direction as viewed in Figure 5. The push rod 65 extends vertically and is supported for vertical sliding movement by way of a pair of vertically aligned spaced bearings. The lower bearing is connected to, and forms a part of, the bracket 66 and the upper bearing is associated with a bracket 67 on the central upper portion of the crosspiece of the U-shaped bracket 31. The push rod 65 is in vertical alignment with the control element 62 of the limit switch 58 and has the lower end thereof pivotally connected to the rear end of the lever 64. The upper end of the push rod 65 is arranged so that it is disposed adjacent the control element 62 of the limit switch 58 when the carriage 28 is in its up position. A compression spring 68 serves to urge the push rod 65 downwards. This spring is mounted on the central portion of the push rod 65 and is interposed between the bracket 67 and a collar on the push rod. When a trolley rolls onto the rail section 17 while the carriage 28 is in its up position the trigger 63 is depressed as soon as the wheel of the trolley rides over it. Downward shift of the trigger causes the lever 64 to rock and results in the push rod 65 sliding upwards and in turn shifting upwards the control element 62 of the switch 58. When the trolley is propelled from the rail section 17 onto the following rail section 16 after a carcass dipping operation the trigger 63 is shifted upwards in response to the action of the compression spring 68 and the push rod 65 slides downward and frees the control element 62 so that it moves downwards. Said control element 62 is also freed for downward movement when the carriage 28 moves downwards from its up position and is shifted upwards when the carriage is returned to its up position. A description of the function and mode of operation of the limit switch 58 appears hereafter. The limit switches 59 and 60 coact with the limit switch 58 to control operation of the electric motor 44. They are mounted in opposed relation on the upper front portion of the frame structure 50 and are actuated by a cam equipped arm 69 which is fixed to, and extends radially from, the front end of the shaft 52. The cam equipped arm during rotation of the crank 48, operates successively and momentarily to close the limit switch 59 and open the limit switch 60. The arrangement of the two last mentioned limit switches and the arm 69 is such that the limit switch 59 is momentarily closed after the crank 48 has rotated throughout an arc of approximately 180° and the limit switch 60 is opened toward the end of a complete revolution on the part of the crank.

Figure 7:
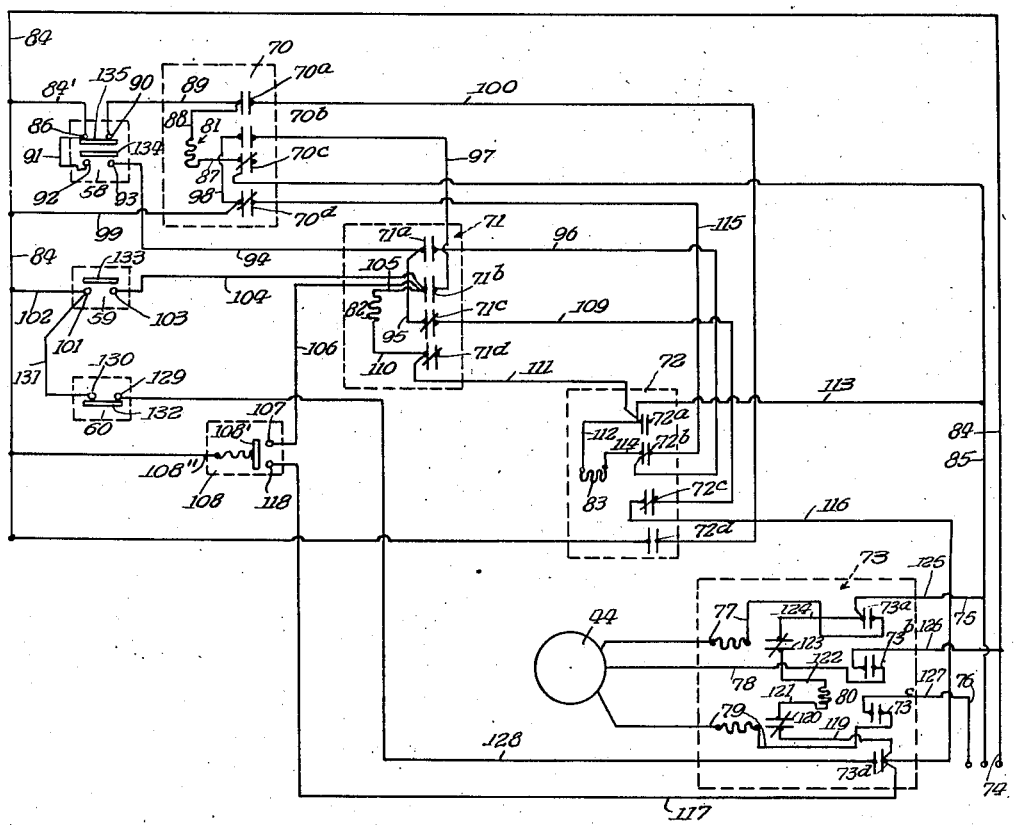
Figure 7 is a diagram of the electrical control circuit for the motor of the mechanism for shifting the rail section carrying carriage back and forth between its down and up positions.

The electrical control system for the motor 44 is shown diagrammatically in Figure 7 and in addition to the three limit switches 58, 59 and 60 includes three control relays 70, 71 and 72 and a motor starter or contactor 73. A supply of three phase current is indicated in the diagram by the lines 74, 75 and 76. The contactor 73 includes normally open contacts $73^a$, $73^b$, $73^c$ and $73^d$, the contacts $73^a$, $73^b$ and $73^c$ controlling the supply of current to the motor 44 through intermediate wires 77, 78 and 79, respectively. The contacts $73^d$ operate to form a holding circuit for a coil 80 of the contactor after it has once been energized through actuation of the limit switch 58. The relay 70 includes normally open contacts $70^a$ and $70^b$ and normally closed contacts $70^c$ and $70^d$. The energizing coil for this relay is indicated at 81. The relay 71 has normally open contacts $71^a$ and $71^b$ and normally closed contacts $71^c$ and $71^d$. The operating coil for the latter relay is indicated at 82. The relay 72 has normally open contacts $72^a$ and $72^b$ and normally closed contacts $72^c$ and $72^d$. The operating coil of this relay is indicated at 83.

Current for operating the relays is taken from the supply lines 74 and 75 through wires 84 and 85, the wire 84 extending to one of the contacts $72^d$ and being connected also to a terminal 86 on the limit switch 58 by the wire 84. The wire 85 extends to one of the contacts $70^c$ and through a connecting wire 87 supplies current continuously to one end of the relay coil 81. The other end of the coil 81 is connected by a wire 88 to one of the contacts $70^a$ which in turn is connected by a wire 89 to a second terminal 90 on the limit switch 58. The terminal 86 is connected by a wire 91 to a third terminal 92 on the switch 58. A fourth terminal 93 is connected by a wire 94 to one of the contacts $71^a$ which in turn is connected to one of the contacts $71^c$ by means of a wire 95. A wire 96 connects the other contact $71^a$ with one of the contacts $72^b$. A wire 97 connects one of the contacts $71^b$ with one of the contacts $70^b$. The other contact $70^b$ is connected by a wire 98 to one of the contacts $70^d$ and said one contact $70^d$ is in turn connected by a wire 99 to the control current supply wire 84. The other contact $70^a$ is connected by a wire 100 to one of the contacts $72^d$, the other of which is connected to the end of the wire 84.

The normally opened limit switch 59 has a terminal 101 which is connected to the wire 84 by a wire 102, and has a second terminal 103 which is connected by a wire 104 to one of the contacts $71^b$. This one contact $71^b$ is also connected by a wire 105 to one end of the relay coil 82 and by a wire 106 to one terminal 107 of a reset device 108. A wire 109 connects the other of the contacts $71^c$ with one of the contacts $72^c$. A wire 110 connects the other end of the coil 82 to one of the contacts $71^d$, which is in turn connected by a wire 111 to one of the contacts $72^a$. This said one contact $72^a$ is connected by a wire 112 to one end of the relay coil 83 and by a wire 113 to the control current supply wire 85. The other end of the coil 83 is connected by a wire 114 to one of the contacts $72^b$, this being the same one of the contacts $72^b$ to which the wire 96 connects. The other of the contacts $72^b$ is connected by a wire 115 to the other of the contacts $70^d$. The other of the contacts $72^c$ is connected by a wire 116 to one of the contacts $73^d$, this one contact being in turn connected by a wire 117 to a second terminal 118 of the reset device 108 and by a wire 119, a normally closed switch 120 and a wire 121 to one end of the contactor coil 80. The other end of the contactor coil is connected through a wire 122, a normally closed switch 123 and a wire 124 to one of the contacts 73ª, which one contact in turn is connected by wire 125 to the line 75. The switches 120 and 123 remain closed even when the contactor 73 is closed. A wire 126 connects one of the contacts 73ᵇ to the line 74 and a wire 127 connects one of the contacts 73ᶜ to the line 76. The other of the contacts 73ᵈ is connected by a wire 128 to one terminal 129 of the normally closed limit switch 60, the other terminal 130 of this particular switch being connected by a wire 131 to the terminal 101 of the switch 59. A switch member 132 normally closes the limit switch 60 and a switch member 133 is adapted to close the limit switch 59. These two switch members 132 and 133 are controlled by the cam equipped arm 69 on the shaft 52. The limit switch 58 has a normally open switch member 134 and a normally open switch member 135. Such switch members are controlled by the vertically movable control element 62 of the switch 58.

The operation of the control circuit for the motor 44 is as follows: The supply of current to the lines 74, 75 and 76 causes closing of the relay 70, the coil 81 thereof being energized by reason of the fact that one end thereof is connected to the wire 84 through wire 84', switch member 135, and wires 89 and 88, and the other end is connected to the supply wire 85 through wire 87. When the relay 70 is closed, a holding circuit for the coil 81 extends through wire 100 and contacts 72ᵈ to wire 84, this holding circuit being effective to maintain said coil 81 energized even though the limit switch 58 may be actuated momentarily and the terminals 86 and 90 thereby disconnected. As soon as a carcass supporting trolley is propelled onto the rail section 17 the wheel thereof engages and depresses the trigger 63. Depression of the trigger, as hereinbefore described, results in upward shift of the push rod 65 and the control element 62 of the limit switch 58. This operation causes starting of the motor 44 through actuation of the limit switch 58. Upward shift of the control element 62 of such switch causes the switch members 134 and 135 to connect the terminals 92 and 93 and to disconnect the terminals 86 and 90. Connection of the terminals 92 and 93 closes a circuit to the coil 80 of the contactor 73 through wires 94 and 95, contacts 71ᶜ, wire 109, contact 72ᶜ, wires 116 and 119, contact 120 and wire 121, the other end of the coil 80 being permanently connected to the supply wire 85 through wire 122, contacts 123 and wires 124 and 125. The contactor 73 is thus operated to close the contacts 73ª, 73ᵇ, 73ᶜ and 73ᵈ, and thereby start the motor 44. Closing of the contact 73ᵈ completes a holding circuit for the coil 80 through wire 128, normally closed limit switch 60 and wires 131 and 102. This holding circuit is necessary since the limit switch 58 is released and reopens contacts 92, 93 as soon as the carriage 28 starts its downward movement. The motor 44 continues to run and, through the medium of the speed reducer 45, the pinion 46 and the gear wheel 47, drives the crank 48 through one complete revolution during which a dipping operation takes place. When the crank 48 has turned through approximately 180 degrees the cam equipped arm 69 on the shaft 52 engages and closes the limit switch 59 momentarily, thus energizing relay 71 and rearranging the connections of the circuit so that the next closure of limit switch 58 will effect the operation of relay 72 instead of the contactor 73. This is necessary so that upon the completion of the dipping operation and when the carriage 28 reaches its up position and again actuates the limit switch 58, the dipping operation will not repeat until another carriage has been moved onto the hoist. Momentary closing of the limit switch 59 completes a circuit to the relay coil 82 from the supply wire 85 through wires 102, 104 and 105, the other end of the coil 82 being connected to the current supply wire 84 through wires 110, 111 and 113. Operation of the relay 71 opens the contacts 71ᶜ through which one holding circuit for the contactor coil 80 had been completed after the limit switch 58 was restored upon initial lowering of the carriage. When the relay 71 is closed the coil 83 of relay 72 is placed in readiness for energization when the limit switch 58 is again actuated. Thus one end of the coil 83 is connected through wires 112 and 113 to one supply line 85 and the other end of the coil 83 is connected through wires 114 and 96, contacts 71ª and wire 94 to terminal 93 of the limit switch 58. At the same time the control circuit for the coil 80 of contactor 73, which extended through the wire 116, contacts 72ᶜ, wire 109, contacts 71ᶜ, and wires 95 and 94 to terminal 93 of the limit switch 58 is broken by the opening of the contacts 71ᶜ so that when the limit switch 58 is again actuated, the coil 80 of the contactor 73 will not be energized.

When the carriage 28 approaches its up position the cam equipped arm 69 opens the limit switch 60 and thereby breaks the holding circuit for the coil 80 of the contactor 73, which holding circuit comprises wires 102 and 131, switch 60, wire 128, contacts 73ᵈ, wire 119, switch 120 and wire 121. The contactor 73 thus drops out and opens the motor control contacts 73ª, 73ᵇ and 73ᶜ as well as the holding circuit contact 73ᵈ whereupon the motor stops even though the limit switch 58 is again actuated. Actuation of the limit switch 58 at this time effects the closing of relay 72 and the opening of relay 70. Relay 72 closes because the coil 83 thereof is energized, one side being connected to the supply wire 85 through wires 112 and 113 and the other side thereof being connected through wires 114 and 96, contacts 71ª and wire 94 to the terminal 93 of limit switch 58. The relay 70 is opened because the circuit through terminals 86, 90 of limit switch 58 is broken and the holding circuit for the relay coil 81 which extended through wire 100 and contacts 72ᵈ was broken with the energization of relay 72 since then the contacts 72ᵈ were opened.

As soon as the carriage 28 reaches its up position the next following pusher finger 24 on the conveyor pushes the trolley with the dipped carcass suspended therefrom off of the trigger 63 and allows the limit switch 58 to return to its normal position. Relay 72 then drops out because relay 70 recloses, thereby opening the contacts 70ᵈ in the holding circuit for the coil 83 of relay 72. The electrical control circuit is then in readiness to repeat the cycle heretofore described as soon as the next succeeding carcass supporting trolley is propelled onto the rail section 17.

The reset device 108 is provided to permit restarting of the motor 44 in the event the power supply to lines 74, 75 and 76 should fail while the motor is in operation. Under this condition, actuation of the reset device causes a switch member 108' thereof (which is connected to the supply wire 84 by a wire (108") to engage terminals 107 and 118. Since the terminal 118 is connected to the wire 119, closing of the reset device switch causes energization of the contactor coil 80. Engagement of the switch member 108' with the terminal 107 causes energization of relay coil 82, the same as if limit switch 59 had been actuated. Thus if the power supply fails after switch 59 is operated, relay 71 is properly energized. If the power supply fails before switch 59 is actuated the reset device closes relay 71 in advance of its usual time but this does not change the subsequent portion of the cycle.

In addition to the aforementioned parts the apparatus includes a device or means for automatically locking the carcass supporting trolley that is on the vertically movable rail section 17 against displacement relatively to such rail section during the down and up strokes of the carriage 28. This device comprises a pair of horizontally extending parallel rods 136 which are disposed beneath the U-shaped bracket 31 of the carriage 28 and extend transversely of the vertically movable rail section 17. The front ends of the rods extend through, and are slidably mounted in, holes 137 in the end portions of the rail section 17, as shown in Figure 3. The rear ends of the rods extend through, and are slidably mounted in, holes 138 in a bracket 139. The latter is secured to, and depends from, the side pieces of the carriage bracket 31 (see Figure 5). The rail section 17 and the bracket 139 support the two rods 136 so that they are axially or longitudinally slidable. When the rods are slid forwards the front ends thereof straddle the frame of the trolley on the rail section 17 and thus prevent the trolley from travelling relatively to the rail section 17. When the two rods are shifted rearwards the front ends are moved out of straddled relation with the frame of the trolley on said rail section and thus permit the trolley to be pushed onto the following rail section 16. As hereinafter described, the two rods are shifted forwards into straddled relation with the frame of the trolley of the rail section 17 as soon as such rail section starts to move downwards towards its down position and remain in their forward or straddled position until the rail section 17 is returned to its up or operative position after a hog dipping operation. As soon as the rail section 17 is returned to its up position the rods are automatically shifted rearwards so as to release the trolley for further travel along the overhead rail 8 by action of the chain type conveyor 11. The rods 136 are urged forwards into their operative or trolley straddling position by way of a pair of compression springs 140. These springs are mounted respectively on the central portions of the rods and have the rear ends thereof in abutment with the bracket 139. The front ends of the springs abut against collars 141 on the rods. The rear ends of the rods are cross connected by way of a horizontally extending rod 142. This rod serves to connect the rods 136 for conjoint sliding movement. The two rods 136 are automatically retracted against the force of the springs 140 when the carriage 28 is shifted in its up position by means of a shaft 143, a pair of arms 144, an arm 145 and a stop 146. The shaft 143 is disposed above and in parallel relation with the rod 142 and extends through, and is rotatably mounted in, holes 147 in the side pieces in the carriage bracket 31. The arms 144 are fixed to, and radiate from, the ends of the shaft 143 and have in their outer or distal ends longitudinal slots 144ª for the ends of the rod 142. When the shaft 143 and the arms 144 are rocked in a counterclockwise direction as viewed in Figure 5, the rods 136 are shifted rearwards into their retracted or inoperative position. The arm 145 is fixed to one end of the shaft 143 and projects forwardly at substantially a right angle with respect to the arms 144. The stop 146 is in the form of a vertically extending bolt which is connected to, and depends from, the bracket 61 on the rear end of the platform 36. It overlies the arm 145 and is so positioned that when the carriage 28 is shifted upwards into its up position after a carcass dipping operation the arm 145 strikes against it and causes the shaft 143 and the arms 144 to rock in a counterclockwise direction as viewed in Figure 5, and thus retract the rods 136. When the carriage 28 moves downwards after a carcass supporting trolley 10 travels onto the rail section 17 and depresses the trigger 63, the arm 145, during the initial part of downward movement on the part of the carriage, moves out of contact with the stop 146 with the result that the compression springs 140 shift the rods 136 forwards into their operative position wherein they straddle the frame of the trolley on the rail section 17. The two rods remain in such position during the down stroke and the major portion of the up stroke of the carriage and hence lock the trolley against forward or aft displacement with respect to the vertically movable rail section. At the end of the up stroke of the carriage 28 the arm 145 strikes against the rigid or stationary stop 146 and operates, as hereinbefore described and through the medium of the shaft 143 and the arms 144, to retract the rods 136. As soon as the rods are retracted the trolley on the rail section 17 is free so that it may be moved from the vertically movable rail section onto the following rail section 16 by the next following pusher finger 24. The rods 136, the springs 140, the rod 142, the shaft 143, the arms 144 and 145 and the stop 146 constitute or exemplify simple means whereby the carcass supporting trolley on the rail section 17 is automatically locked against displacement during the down and up strokes of the carriage 28 in connection with a carcass dipping operation. By providing means of the aforementioned character there is no likelihood of a carcass being displaced from the rail section during a dipping operation.

Assuming that the circuit for the electric motor 44 is operative and the conveyor 11 is being driven by the electric motor 25 the operation of the apparatus is as follows: The pusher fingers 23 on the conveyor propel the carcass supporting trolleys in series form along the preceding rail section 15 of the overhead rail 8. As soon as the leading trolley is pushed onto the vertically movable rail section 17 the wheel of the trolley depresses the trigger 63. As soon as the trigger is depressed current is supplied to the motor 44, as previously described, and the motor, through the medium of the speed reducer 45, the pinion 46 and the gear wheel 47, swings the crank 48 throughout an arc of 360°. During down swing of the crank the carriage 28 and the rail section 17 together with the carcass that is suspended from the trolley on the rail section 17 move downwards toward the dipping tank 9. As the carriage moves downward the carcass enters the tank and receives a coating of the hot resinous material therein. On the upstroke of the crank 48 the carcass is withdrawn from the tank and the carriage and vertically movable rail section are raised into their up position. As soon as the crank reaches the end of its 360° arc the motor 44 stops as hereinbefore described. As soon as the rail section 17 reaches its up position in connection with stoppage of the electric motor 44 the next following pusher finger 24 engages the trolley on said rail 17 and pushes it onto and along the following rail section 16. As soon as the trolley leaves the rail section 17 the trigger 63 moves upwards and said rail section is in condition to receive the next following carcass supporting trolley and the same cycle of operations again takes place. During the down and up strokes of the rail section 17 the trolley for the carcass being dipped is locked against travel on the rail section 17 by way of the rods 136 as hereinbefore described.

The herein described carcass dipping apparatus effectively and efficiently fulfills its intended purpose and is capable of dipping carcasses at a comparatively high rate of speed. It is essentially automatic and involves a novel and compact arrangement of parts. Because of its design or construction the apparatus may be installed in any combined slaughtering and packing house having an overhead trolley supporting rail for conveying or moving the carcasses from the dehairing machine to the cutting and inspection line or the polishing machine in front of such line.

The invention is not to be understood as restricted to the details set forth since these may be modified within the scope of the appended claims without departing from the spirit and scope of the invention.

Having thus described the invention what I claim as new and desire to secure by Letters Patent is:

1. The combination with a tank containing coating material, of an overhead rail extending over the tank, adapted to have trolleys with carcasses suspended therefrom travel in spaced apart order along it, and provided with a cutout directly above the tank dividing it into a preceding and a following rail section, a power driven conveyor extending along the rail, provided with a series of pairs of spaced apart pusher fingers for the trolleys, and adapted when driven to have the leading fingers of the pairs propel the trolleys constantly along the preceding rail section to the cutout, means for dipping the carcasses into the tank for coating purposes comprising a rail section shaped to fit within the cutout and mounted to slide between an up position wherein it bridges the cutout and is adapted to receive a carcass supporting trolley from the preceding rail section and a down position wherein the carcass suspended from the trolley thereon is immersed in the material in the tank and then back again to its up position in order that the trolley thereon with the coated carcass is in position to be propelled onto the following rail section, and power driven mechanism independent of the drive means for the conveyor adapted to slide the movable rail section back and forth between its said up and down positions and designed and controlled automatically in such manner that each time a trolley is propelled onto the movable rail section by the leading finger of one pair while such movable rail section is in its up position, it slides the movable rail section into its down position for carcass dipping purposes and then returns said movable rail section to its up position in time for the trailing finger of said one pair to propel the trolley onto the following rail section.

2. The combination with a tank containing coating material, of an overhead rail extending over the tank, adapted to have trolleys with carcasses suspended therefrom travel in spaced apart order along it, and provided with a cutout directly above the tank dividing it into a preceding and a following rail section, a power driven conveyor extending along the rail, provided with a series of pairs of spaced apart pusher fingers for the trolleys, and adapted when driven to have the leading fingers of the pairs propel the trolleys constantly along the preceding rail section to the cutout, means for dipping the carcasses into the tank for coating purposes comprising a rail section shaped to fit within the cutout and mounted to slide vertically between an up position wherein it bridges the cutout and is adapted to receive a carcass supporting trolley from the preceding rail section and a down position wherein the carcass suspended from the trolley thereon is immersed in the material in the tank and then back again to its up position in order that the trolley thereon with the coated carcass is in position to be propelled onto the following rail section, and mechanism including an electric motor, adapted to slide the movable rail section back and forth between its said up and down positions and designed and controlled automatically so that each time a trolley is propelled onto the movable rail section by the leading finger of one pair of fingers while such movable rail section is in its up position, it slides the movable rail section into its down position for carcass dipping purposes, and then returns the said movable rail section into its up position in time for the trailing finger of said one pair to propel the trolley onto the following rail section.

3. In combination with a tank containing coating material and a single overhead rail over the tank adapted to have trolleys with carcasses suspended therefrom travel in series form along it and provided with a cutout directly above the tank dividing it into a preceding and a following rail section, an apparatus for dipping the carcasses one at a time into the tank for coating purposes comprising a rail section shaped to fit within the cutout, an upstanding rod adjacent the tank, a carriage having the last mentioned rail section connected fixedly to it and mounted slidably on the rod so that it is slidable vertically back and forth between an up position wherein said last mentioned rail section bridges the cutout and is adapted to receive a carcass supporting trolley from the preceding rail section, and a down position wherein the carcass suspended from the trolley on the rail section thereon is immersed in the material in the tank, mechanism for positively sliding the carriage back and forth between its said up and down positions, embodying a crank positioned wholly above the overhead rail and directly over the carriage and arranged to revolve in a vertical plane, a connecting rod having one end thereof pivotally connected to the distal end of the crank and its other end pivotally connected to the carriage, and an electric motor for driving the crank, and an electric control system for the motor operative automatically to start the motor each time a carcass supporting trolley is moved onto the movable rail section from the preceding rail section and to stop the motor upon return of said movable rail section to its up position after a carcass dipping operation.

4. In combination with a tank containing coating material and an overhead rail over the tank adapted to have trolleys with carcasses suspended therefrom travel in series form along it and provided with a cutout directly above the tank dividing it into a preceding and a following rail section, an apparatus for dipping the carcasses one at a time into the tank for coating purposes comprising a rail section shaped to fit within the cutout, an upstanding rod adjacent the tank, a carriage having the last mentioned rail section connected fixedly to it and mounted slidably on the rod so that it is slidable vertically back and forth between an up position wherein said last mentioned rail section bridges the cutout and is adapted to receive a carcass supporting trolley from the preceding rail section, and a down position wherein the carcass suspended from the trolley on the rail section thereon is immersed in the material in the tank, mechanism for sliding the carriage back and forth between its said up and down positions embodying an electric motor, a crank connected for positive drive by said motor and arranged to revolve in a vertical plane, and a connecting rod having one end thereof pivotally connected to the distil end of the crank and its other end pivotally connected to the carriage, and an electric control system for the motor operative automatically to start the motor each time a carcass supporting trolley is moved onto the movable rail section from the preceding rail section and to stop the motor upon return of said movable rail section to its up position after a carcass dipping operation.

5. In combination with a tank containing coating material and an overhead rail adapted to have trolleys with carcasses suspended therefrom travel in series form along it and provided with a cutout over the tank dividing it into a preceding rail section and a following rail section, an apparatus for dipping the carcasses one at a time into the tank for coating purposes comprising a rail section shaped to fit within the cutout and mounted to move from an up position wherein it bridges the cutout and is adapted to receive a carcass supporting trolley from the preceding rail section, and a down position wherein the carcass suspended from the trolley thereon is immersed in the material in the tank, and then back again to its up position in order that the trolley thereon with the coated carcass may be moved onto the following rail section, an electric motor, mechanism driven by the motor for moving the movable rail section between its said up and down positions, and an electric control system for the motor operative automatically to start the motor each time a carcass supporting trolley is moved onto the movable rail section from the preceding rail section and to stop the motor upon return of said movable rail section to its up position after a carcass dipping operation.

6. In combination with a tank containing coating material and an overhead rail adapted to have trolleys with carcasses suspended therefrom travel in series form along it and provided with a cutout over the tank dividing it into a preceding rail section and a following rail section, an apparatus for dipping the carcasses one at a time into the tank for coating purposes comprising a rail section shaped to fit within the cutout and mounted to move from an up position wherein it bridges the cutout and is adapted to receive a carcass supporting trolley from the preceding rail section, and a down position wherein the carcass suspended from the trolley thereon is immersed in the material in the tank, and then back again to its up position in order that the trolley thereon with the coated carcass may be moved onto the following rail section, mechanism including an electric motor for moving the movable rail section between its said up and down positions, and an electric control system for the motor operative automatically to start the motor each time a carcass supporting trolley is shifted onto the movable rail section from the preceding rail section and to stop the motor upon return of the movable rail section to its up position after a carcass dipping operation, said system including an element movably mounted on the movable rail section and arranged so that it is moved in one direction when a trolley is propelled onto said movable rail section preliminary to a carcass dipping operation, and means for shifting the element in the opposite direction when the trolley is propelled from the movable rail section onto the following track section after a carcass dipping operation.

ADOLF G. ACKERMANN.